US009838868B1

(12) United States Patent
Nelson et al.

(10) Patent No.: US 9,838,868 B1
(45) Date of Patent: Dec. 5, 2017

(54) MATED UNIVERSAL SERIAL BUS (USB) WIRELESS DONGLES CONFIGURED WITH DESTINATION ADDRESSES

(71) Applicant: Sprint Communications Company L.P., Overland Park, KS (US)

(72) Inventors: Tracy L. Nelson, Overland Park, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 389 days.

(21) Appl. No.: 14/606,011

(22) Filed: Jan. 26, 2015

(51) Int. Cl.
  *H04W 12/04* (2009.01)
  *H04W 4/18* (2009.01)
  *H04W 8/26* (2009.01)
  *G06F 13/42* (2006.01)

(52) U.S. Cl.
  CPC ........ *H04W 12/04* (2013.01); *G06F 13/4265* (2013.01); *H04W 4/18* (2013.01); *H04W 8/26* (2013.01); *G06F 2221/2153* (2013.01)

(58) Field of Classification Search
  CPC ... G06F 21/78; G06F 21/85; G06F 2221/2153
  USPC .......................................................... 726/9
  See application file for complete search history.

(56) References Cited

U.S. PATENT DOCUMENTS

| 5,303,378 | A | 4/1994 | Cohen |
| 5,321,735 | A | 6/1994 | Breeden et al. |
| 5,764,889 | A | 6/1998 | Ault et al. |
| 5,796,952 | A | 8/1998 | Davis et al. |
| 5,825,876 | A | 10/1998 | Peterson, Jr. |
| 6,131,024 | A | 10/2000 | Boltz |
| 6,177,860 | B1 | 1/2001 | Cromer et al. |
| 6,219,712 | B1 | 4/2001 | Mann et al. |
| 6,222,463 | B1 | 4/2001 | Rai |

(Continued)

FOREIGN PATENT DOCUMENTS

| EP | 1933252 A1 | 6/2008 |
| JP | 6171245 B2 | 8/2017 |

(Continued)

OTHER PUBLICATIONS iTwin Connect—"User Guide for Windows"j; 30 Pages Dated 2013.*

(Continued)

*Primary Examiner* — Brian Misiura

(57) ABSTRACT

A mated pair of Universal Serial Bus (USB) wireless dongles are disclosed. The dongles comprise a first USB dongle that comprises a first processor, a first read only memory (ROM) storing an address of a second USB dongle, a first radio transceiver, a first USB connector, and a first application. When executed by the first processor, the first application receives a USB formatted message from the first USB connector; transcodes the USB formatted message for wireless transmission; transmits the transcoded message to the address of the second dongle. The dongles further comprise the second dongle, which comprises a second processor, a second ROM storing an address of the first dongle, a second radio transceiver, a second USB connector, a second application that, when executed by the second processor, receives the message from the first dongle; confirms that the first USB is its mate; and communicates with the first dongle.

20 Claims, 3 Drawing Sheets

(56) References Cited

U.S. PATENT DOCUMENTS

| | | | |
|---|---|---|---|
| 6,363,150 B1 | 3/2002 | Bhagavath et al. | |
| 6,389,403 B1 | 5/2002 | Dorak, Jr. | |
| 6,434,561 B1 | 8/2002 | Durst, Jr. et al. | |
| 6,477,180 B1 | 11/2002 | Aggarwal et al. | |
| 6,507,869 B1 | 1/2003 | Franke et al. | |
| 6,507,904 B1 | 1/2003 | Ellison et al. | |
| 6,614,893 B1 | 9/2003 | Paiz | |
| 6,651,171 B1 | 11/2003 | England et al. | |
| 6,668,322 B1 | 12/2003 | Wood et al. | |
| 6,691,230 B1 | 2/2004 | Bardon | |
| 6,754,784 B1 | 6/2004 | North et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,023,979 B1 | 4/2006 | Wu et al. | |
| 7,043,241 B1 | 5/2006 | Sladek et al. | |
| 7,069,234 B1 | 6/2006 | Cornelius et al. | |
| 7,127,541 B2* | 10/2006 | Govindarajulu | H04W 4/18 709/217 |
| 7,366,806 B2 | 4/2008 | Milenkovic et al. | |
| 7,386,275 B2 | 6/2008 | Pirzada et al. | |
| 7,387,240 B2 | 6/2008 | Ziegler | |
| 7,519,824 B1 | 4/2009 | Peyravian et al. | |
| 7,552,467 B2 | 6/2009 | Lindsay | |
| 7,571,364 B2 | 8/2009 | Whetsel | |
| 7,574,382 B1 | 8/2009 | Hubert | |
| 7,650,645 B1 | 1/2010 | Langendorf et al. | |
| 7,716,720 B1 | 5/2010 | Marek et al. | |
| 7,761,558 B1 | 7/2010 | Jindal et al. | |
| 7,849,309 B1 | 12/2010 | Brown | |
| 7,873,837 B1 | 1/2011 | Lee et al. | |
| 7,895,642 B1 | 2/2011 | Larson et al. | |
| 7,921,303 B2 | 4/2011 | Mauro, II | |
| 8,060,449 B1 | 11/2011 | Zhu | |
| 8,073,428 B2 | 12/2011 | Khetawat et al. | |
| 8,086,238 B1 | 12/2011 | Kosar | |
| 8,112,794 B2 | 2/2012 | Little et al. | |
| 8,190,919 B2 | 5/2012 | Natarajan et al. | |
| 8,204,480 B1 | 6/2012 | Lindteigen et al. | |
| 8,238,823 B2 | 8/2012 | Maugars et al. | |
| 8,271,336 B2 | 9/2012 | Mikurak | |
| 8,295,811 B1 | 10/2012 | Gailloux et al. | |
| 8,298,295 B2 | 10/2012 | Aissi et al. | |
| 8,316,237 B1 | 11/2012 | Felsher et al. | |
| 8,332,895 B2 | 12/2012 | Nathan et al. | |
| 8,332,953 B2 | 12/2012 | Lemieux et al. | |
| 8,402,543 B1 | 3/2013 | Ranjan et al. | |
| 8,413,229 B2 | 4/2013 | Mullick et al. | |
| 8,429,409 B1 | 4/2013 | Wall et al. | |
| 8,442,588 B2* | 5/2013 | Sims | G06F 13/4068 359/196.1 |
| 8,443,420 B2 | 5/2013 | Brown et al. | |
| 8,447,983 B1 | 5/2013 | Beck et al. | |
| 8,494,576 B1 | 7/2013 | Bye et al. | |
| 8,498,572 B1 | 7/2013 | Schooley et al. | |
| 8,504,097 B1 | 8/2013 | Cope et al. | |
| 8,542,833 B2 | 9/2013 | Devol et al. | |
| 8,566,183 B1 | 10/2013 | Bonar et al. | |
| 8,588,749 B1 | 11/2013 | Sadhvani et al. | |
| 8,590,012 B2 | 11/2013 | Roy et al. | |
| 8,631,247 B2 | 1/2014 | O'Loughlin et al. | |
| 8,632,000 B2 | 1/2014 | Laracey | |
| 8,649,770 B1 | 2/2014 | Cope et al. | |
| 8,650,492 B1 | 2/2014 | Mui et al. | |
| 8,661,119 B1 | 2/2014 | Jindal et al. | |
| 8,667,607 B2 | 3/2014 | Paczkowski et al. | |
| 8,681,969 B1 | 3/2014 | Rodde et al. | |
| 8,707,056 B2 | 4/2014 | Felton | |
| 8,712,407 B1 | 4/2014 | Cope et al. | |
| 8,718,554 B2 | 5/2014 | Abel | |
| 8,719,586 B1 | 5/2014 | Paleja et al. | |
| 8,726,343 B1 | 5/2014 | Borzycki et al. | |
| 8,738,333 B1 | 5/2014 | Behera et al. | |
| 8,750,839 B1 | 6/2014 | Paczkowski et al. | |
| 8,752,140 B1 | 6/2014 | Paczkowski et al. | |
| 8,762,298 B1 | 6/2014 | Ranjan et al. | |
| 8,787,873 B1 | 7/2014 | Hitt et al. | |
| 8,793,808 B2 | 7/2014 | Boccon-Gibod | |
| 8,797,875 B2 | 8/2014 | Garcia Martin et al. | |
| 8,811,971 B2 | 8/2014 | Corda et al. | |
| 8,826,015 B2* | 9/2014 | Lakshminarayanan | G06F 21/445 380/278 |
| 8,831,998 B1 | 9/2014 | Cramer et al. | |
| 8,839,460 B2 | 9/2014 | Shirlen et al. | |
| 8,850,568 B2 | 9/2014 | Shirlen et al. | |
| 8,856,600 B2 | 10/2014 | Zadigian et al. | |
| 8,862,181 B1 | 10/2014 | Cope et al. | |
| 8,863,252 B1 | 10/2014 | Katzer et al. | |
| 8,868,898 B1* | 10/2014 | Van Hoof | G06F 21/575 710/200 |
| 8,881,977 B1 | 11/2014 | Paczkowski et al. | |
| 8,886,925 B2 | 11/2014 | Qureshi et al. | |
| 8,954,588 B1 | 2/2015 | Bertz et al. | |
| 8,984,592 B1 | 3/2015 | Paczkowski et al. | |
| 8,989,705 B1 | 3/2015 | Katzer et al. | |
| 9,015,068 B1 | 4/2015 | Bertz et al. | |
| 9,021,585 B1 | 4/2015 | Paczkowski et al. | |
| 9,027,102 B2 | 5/2015 | Katzer et al. | |
| 9,049,013 B2 | 6/2015 | Paczkowski et al. | |
| 9,049,186 B1 | 6/2015 | Paczkowski et al. | |
| 9,066,230 B1 | 6/2015 | Paczkowski et al. | |
| 9,069,952 B1 | 6/2015 | Paczkowski et al. | |
| 9,104,840 B1 | 8/2015 | Paczkowski et al. | |
| 9,118,655 B1 | 8/2015 | Paczkowski et al. | |
| 9,161,227 B1 | 10/2015 | Bye et al. | |
| 9,161,325 B1 | 10/2015 | Urbanek | |
| 9,171,243 B1 | 10/2015 | Cordes et al. | |
| 9,177,157 B2* | 11/2015 | Binder | H04L 63/18 |
| 9,183,412 B2 | 11/2015 | Bye et al. | |
| 9,183,606 B1 | 11/2015 | Paczkowski et al. | |
| 9,185,626 B1 | 11/2015 | Kunkel et al. | |
| 9,191,388 B1 | 11/2015 | Paczkowski et al. | |
| 9,191,522 B1 | 11/2015 | Krieger et al. | |
| 9,208,339 B1 | 12/2015 | Paczkowski et al. | |
| 9,210,576 B1 | 12/2015 | Cope et al. | |
| 9,215,180 B1 | 12/2015 | Bertz et al. | |
| 9,226,145 B1 | 12/2015 | Loman et al. | |
| 9,230,085 B1 | 1/2016 | Paczkowski et al. | |
| 9,253,589 B2 | 2/2016 | McCann et al. | |
| 9,268,959 B2 | 2/2016 | Paczkowski et al. | |
| 9,282,898 B2 | 3/2016 | McRoberts et al. | |
| 9,324,016 B1 | 4/2016 | Cordes et al. | |
| 9,374,363 B1 | 6/2016 | Paczkowski et al. | |
| 9,384,498 B1 | 7/2016 | Bertz et al. | |
| 9,443,088 B1 | 9/2016 | Bye et al. | |
| 9,454,723 B1 | 9/2016 | Cordes et al. | |
| 9,473,945 B1 | 10/2016 | Marquardt et al. | |
| 9,560,519 B1 | 1/2017 | McCracken, Jr. et al. | |
| 9,613,208 B1 | 4/2017 | Paczkowski et al. | |
| 9,712,999 B1 | 7/2017 | Cordes et al. | |
| 9,779,232 B1 | 10/2017 | Paczkowski et al. | |
| 2001/0041591 A1 | 11/2001 | Carroll | |
| 2002/0002468 A1 | 1/2002 | Spagna et al. | |
| 2002/0007456 A1 | 1/2002 | Peinado et al. | |
| 2002/0035697 A1 | 3/2002 | McCurdy et al. | |
| 2002/0091569 A1 | 7/2002 | Kitaura et al. | |
| 2002/0095389 A1 | 7/2002 | Gaines | |
| 2002/0156911 A1 | 10/2002 | Croman et al. | |
| 2002/0166070 A1 | 11/2002 | Mualem et al. | |
| 2002/0174344 A1 | 11/2002 | Ting | |
| 2002/0181503 A1 | 12/2002 | Montgomery, Jr. | |
| 2002/0184325 A1 | 12/2002 | Killcommons et al. | |
| 2002/0194361 A1 | 12/2002 | Itoh et al. | |
| 2002/0194496 A1 | 12/2002 | Griffin et al. | |
| 2003/0045273 A1 | 3/2003 | Pyhalammi et al. | |
| 2003/0092435 A1 | 5/2003 | Boivin | |
| 2003/0093667 A1 | 5/2003 | Dutta et al. | |
| 2003/0110046 A1 | 6/2003 | Cofta | |
| 2003/0126225 A1 | 7/2003 | Camble et al. | |
| 2003/0172163 A1 | 9/2003 | Fujita et al. | |
| 2003/0182347 A1 | 9/2003 | Dehlinger | |
| 2003/0216143 A1 | 11/2003 | Roese et al. | |
| 2003/0229514 A2 | 12/2003 | Brown | |
| 2003/0237002 A1 | 12/2003 | Oishi et al. | |

(56) References Cited

U.S. PATENT DOCUMENTS

| | | |
|---|---|---|
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0226468 A1 | 10/2005 | Deshpande et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0156850 A1* | 7/2007 | Corrion .............. G06F 21/6218 709/219 |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1 | 8/2007 | Tethrake et al. |
| 2007/0192652 A1 | 8/2007 | Kao et al. |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky et al. |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0281953 A1* | 11/2008 | Blaisdell .............. H04L 41/28 709/223 |
| 2008/0304640 A1 | 12/2008 | Reilly |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0289764 A1 | 11/2009 | Chiu |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0064341 A1 | 3/2010 | Aldera |
| 2010/0066486 A1 | 3/2010 | Park et al. |

(56) References Cited

U.S. PATENT DOCUMENTS

| | | |
|---|---|---|
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |
| 2010/0127868 A1 | 5/2010 | Hamilton et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1* | 6/2010 | Zahran ............... G06F 13/387 709/212 |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0166806 A1 | 6/2012 | Zhang et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |

(56) References Cited

U.S. PATENT DOCUMENTS

| | | |
|---|---|---|
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1* | 4/2013 | Lakshminarayanan . G06F 21/31 726/28 |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani Rita et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0047548 A1 | 2/2014 | Bye et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0143826 A1 | 5/2014 | Sharp et al. |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0181325 A1 | 6/2014 | Hundal et al. |
| 2014/0188412 A1 | 7/2014 | Mahajan et al. |
| 2014/0188738 A1 | 7/2014 | Huxham |
| 2014/0200051 A1 | 7/2014 | Liu |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1 | 9/2014 | Priebatsch et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0032976 A1 | 1/2015 | Chapier et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |
| 2015/0358455 A1 | 12/2015 | Mosher et al. |
| 2016/0004876 A1 | 1/2016 | Bye et al. |
| 2016/0142396 A1 | 5/2016 | McRoberts et al. |
| 2017/0026840 A1 | 1/2017 | Eyal |

FOREIGN PATENT DOCUMENTS

| | | |
|---|---|---|
| WO | WO2011025433 A1 | 3/2011 |
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |
| WO | WO2014025687 A2 | 2/2014 |
| WO | WO2014158431 A1 | 10/2014 |

OTHER PUBLICATIONS

FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
Office Action dated Aug. 29, 2014, U.S. Appl. No. 13/470,203, filed May 11, 2012.
Notice of Allowance dated Dec. 22, 2014, U.S. Appl. No. 13/470,203, filed May 11, 2012.
FAIPP Pre-Interview Communication dated May 12, 2014, U.S. Appl. No. 13/294,177, filed Nov. 11, 2011.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Feb. 5, 2015, U.S. Appl. No. 13/533,969, filed Jun. 27, 2012.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.

(56) References Cited

OTHER PUBLICATIONS

FAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
First Action Interview Office Action dated Dec. 3, 2014, U.S. Appl. No. 13/594,779, filed Aug. 25, 2012.
Office Action dated May 5, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Restriction Requirement dated Jan. 5, 2015, U.S. Appl. No. 13/857,139, filed Apr. 4, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Search Report and Written Opinion, dated Apr. 22, 2014, PCT/US13/53617, filed on Aug. 5, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Preliminary Report on Patentability, dated Feb. 5, 2015, PCT/US13/51750, filed on Jul. 24, 2013.
Foreign Communication from a Related Counterpart—International Search Report and Written Opinion, dated Jul. 11, 2014, PCT/US14/16651, filed on Feb. 16, 2014.
Ahmed, Farid, et al., "Correlation-based Watermarking Method for Imagine Authentication Applications", Society of Photo-Optical Instrumentation Engineers, Feb. 17, 2004, pp. 1834-1838.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.

(56) References Cited

OTHER PUBLICATIONS

Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Trusted Processing Location Within a Graphics Processing Unit", filed Jul. 10, 2013, U.S. Appl. No. 13/939,175.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Katzer, Robin D., et al., "Web Server Bypass of Backend Process on Near Field Communications and Secure Elements Chips", filed Feb. 26, 2015, U.S. Appl. No. 14/632,850.
Paczkowski, Lyle W., et al., "Trusted Code Generation and Verification to Prevent Fraud from Maleficent External Devices that Capture Data", filed Jan. 14, 2015, U.S. Appl. No. 14/592,218.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
wiseGEEK, "What is a USB Dongle?," www.wisegeek.com/what-is-a-usb-dongle.htm, last accessed Jul. 25, 2014.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Notice of Allowance dated May 29, 2015, U.S. Appl. No. 14/085,474, filed Nov. 20, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.
Advisory Action dated Jun. 10, 2015, U.S. Appl. No. 13/844,282, filed Mar. 15, 2013.

(56) References Cited

OTHER PUBLICATIONS

Office Action dated Aug. 24, 2015, U.S. Appl. No. 13/844,282, filed Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139 filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.
Final Office Action dated Nov. 6, 2015, U.S. Appl. No. 14/632,850, filed Feb. 26, 2015.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
Notice of Allowance dated Sep. 21, 2015, U.S. Appl. No. 14/148,714, filed Jan. 6, 2014.
Notice of Allowance dated Nov. 9, 2015, U.S. Appl. No. 14/659,614, filed Mar. 17, 2015.
Advisory Action dated Nov. 16, 2015, U.S. Appl. No. 13/802,404, filed Mar. 13, 2013.
FAIPP Pre-Interview Communication dated Nov. 18, 2015, U.S. Appl. No. 14/681,077, filed Apr. 7, 2015.
Office Action dated Nov. 19, 2015, U.S. Appl. No. 13/857,139, filed Apr. 4, 2013.
Foreign Communication from a Related Counterpart—International Preliminary Report on Patentability, dated Sep. 24, 2015, PCT/US14/16651, filed Feb. 16, 2014.
Bye, Stephen James, et al., "Systems and Methods for Provisioning and Using Multiple Trusted Security Zones on an Electronic Device," filed Sep. 15, 2015, U.S. Appl. No. 14/855,364.
European Examination Report dated Mar. 3, 2016, EPC Application Serial No. , filed on.
Notice of Allowance dated May 2, 2016, U.S. Appl. No. 13/863,376, filed Apr. 15, 2013.
Office Action dated May 17, 2016, U.S. Appl. No. 13/802,404, filed Mar. 13, 2013.
First Action Interview Office Action dated Mar. 28, 2016, U.S. Appl. No. 14/681,077, filed Apr. 7, 2015.
Notice of Allowance dated Mar. 26, 2016, U.S. Appl. No. 13/857,139, filed Apr. 4, 2013.
European Examination Report dated Jun. 1, 2016, EPC Application Serial No. 14775613.4, filed on Jul. 8, 2015.
Office Action dated Aug. 25, 2016, U.S. Appl. No. 13/860,338, filed Apr. 10, 2013.
Notice of Allowance dated Aug. 24, 2016, U.S. Appl. No. 13/912,190, filed Jun. 6, 2013.
FAIPP Pre-Interview Communication dated Aug. 8, 2016, U.S. Appl. No. 14/596,218, filed Jan. 14, 2015.
Notice of Allowance dated Jun. 15, 2016, U.S. Appl. No. 14/681,077, filed Apr. 7, 2015.
Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003. [32602].

Hamdare, Safa, et al., "Securing SMS Based One Time Password Technique from Man in the Middle Attach," IJETT, vol. 11 Issue 3, May 2014. [53500].
Examiner's Answer dated Nov. 16, 2016, U.S. Appl. No. 14/632,850, filed Feb. 26, 2015.
Notice of Allowance dated Nov. 18, 2016, U.S. Appl. No. 13/802,404, filed Mar. 13, 2013.
FAIPP Pre-Interview Communication dated Oct. 5, 2016, U.S. Appl. No. 15/069,921, filed Mar. 14, 2016.
McCracken, Billy Gene, Jr., et al. "Mobile Communication Device Profound Identity Brokering Framework", filed Nov. 30, 2016, U.S. Appl. No. 15/365,934.
FAIPP Pre-Interview Communication dated Mar. 21, 2017, U.S. Appl. No. 14/855,364, filed Sep. 15, 2015.
European Examination Report dated Feb. 14, 2017, EPC Application Serial No. 14775613.4, filed Jul. 8, 2015.
Final Office Action dated Mar. 9, 2017, U.S. Appl. No. 13/860,338, filed Apr. 10, 2013.
FAIPP Office Action dated Apr. 5, 2017, U.S. Appl. No. 14/596,218, filed Jan. 14, 2015.
Office Action dated Mar. 8, 2017, U.S. Appl. No. 14/947,257, filed Nov. 20, 2015.
Notice of Allowance dated Mar. 10, 2017, U.S. Appl. No. 15/069,921, filed Mar. 14, 2016.
Paczkowski, Lyle W., et al., "System and Method for Secure USIM Wireless Network Access," filed Nov. 20, 2015, U.S. Appl. No. 14/947,257.
Advisory Action dated Jan. 29, 2016, U.S. Appl. No. 14/632,850, filed Feb. 26, 2015.
FAIPP Pre-Interview Communication dated Mar. 1, 2016, U.S. Appl. No. 13/863,376, filed Apr. 15, 2013.
Notice of Allowance dated Feb. 26, 2016, U.S. Appl. No. 13/844,282, filed Mar. 15, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Dec. 17, 2015, U.S. Appl. No. 13/857,141, filed Apr. 4, 2013.
Dietrich, Kurt, et al., "Implementation Aspects of Mobile and Embedded Trusted Computing," Institute for Applied Information Processing and Communications, Trusted Computing Interaction Conference, 2009.
McRoberts, Leo Michael, et al., "End-to-End Trusted Communications Infrastructure," filed Jan. 25, 2016, U.S. Appl. No. 15/005,123.
Cordes, Kevin R., et al., "Digest of Biographical Information for an Electronic Device with Static and Dynamic Portions," filed Mar. 14, 2016, U.S. Appl. No. 15/069,921.
Notice of Allowance dated Jul. 6, 2017, U.S. Appl. No. 14/855,364, filed Sep. 15, 2015.
Japanese Decision for Grant dated Jun. 6, 2017, JP Application Serial No. 2015-524404.
Advisory Action dated Jun. 1, 2017, U.S. Appl. No. 13/860,338, filed Apr. 10, 2013.
Notice of Allowance dated May 30, 2017, U.S. Appl. No. 14/596,218, filed Jan. 14, 2015.
FAIPP Pre-Interview Communication dated May 9, 2017, U.S. Appl. No. 14/853,492, filed Sep. 14, 2015.
Notice of Allowance dated Jul. 7, 2017, U.S. Appl. No. 14/853,492, filed Sep. 14, 2015.
Notice of Allowance dated Jul. 24, 2017, U.S. Appl. No. 14/947,257, filed Nov. 20, 2015.
Bertz, Lyle T., et al., "Hardware Assisted Provenance Proof of Named Data Networking Associated to Device Data, Addresses, Services, and Servers," filed Sep. 14, 2015, U.S. Appl. No. 14/853,492.
Decision on Appeal dated Sep. 15, 2017, U.S. Appl. No. 14/632,850, filed Feb. 26, 2015.
European Examination Report dated Sep. 20, 2017, EPC Application Serial No. 14775613.4, filed on Jul. 8, 2015.
Notice of Allowance dated Jul. 28, 2017, U.S. Appl. No. 13/860,338, filed Apr. 10, 2013.

(56) References Cited

OTHER PUBLICATIONS

Paczkowski, Lyle W., et al., "System and Method for Secure USIM Wireless Network Access," filed Sep. 29, 2017, U.S. Appl. No. 15/719,813.

Marquardt, Ronald R., et al., "Data Link Layer Trust Signaling in Communication Network," filed Jul. 11, 2017, U.S. Appl. No. 15/646,842.

* cited by examiner

MATED UNIVERSAL SERIAL BUS (USB) WIRELESS DONGLES CONFIGURED WITH DESTINATION ADDRESSES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Devices may be able to communicate according to a universal serial bus (USB) protocol and wirelessly transmit data to other USB enabled devices. For example, a USB wireless dongle may have a USB connector that couples to a device and a radio transceiver to send data wirelessly to another USB wireless dongle that is coupled by its USB connector to a second device. The USB protocol may not be an inherently secure pathway for communication, which may lead to attacks from outside sources. Security may be desired when communicating over USB protocol.

SUMMARY

In an embodiment, a mated pair of universal serial bus (USB) wireless dongles is disclosed. The USB wireless dongles comprise a first USB wireless dongle. The first USB wireless dongle comprises a first processor, a first read only memory (ROM) storing a network layer address of a second USB wireless dongle, a first radio transceiver, a first USB connector, and a first application. The first application when executed by the processor receives a USB formatted message input from the first USB connector. The first application transcodes the USB formatted message for wireless transmission. The first application wirelessly transmits the transcoded message to the network layer address of the second USB wireless dongle, wherein the first application restricts a destination address of the transmission to only the network layer address of the second USB wireless dongle. The USB wireless dongles further comprise the second USB wireless dongle. The second USB wireless dongle comprises a second processor, a second ROM storing a network layer address of the first USB wireless dongle, a second radio transceiver, a second USB connector, and a second application. The second application when executed by the second processor receives the message from the first USB wireless dongle. The second application confirms that the first USB wireless dongle is its mate. The second application communicates with the first USB wireless dongle, wherein the second application restricts a destination address of a transmission by the second radio transceiver to only the network layer address of the first USB wireless dongle.

In an embodiment, a mated pair of universal serial bus (USB) wireless dongles is disclosed. The USB wireless dongles comprise a first USB wireless dongle. The first USB wireless dongle comprises a first processor, a first radio transceiver, a first USB connector, a first memory storing a network layer address of a second USB wireless dongle and a first application. The first application when executed by the processor receives a USB formatted message input from the first USB connector. The first application the transcodes the USB formatted message for wireless transmission. The first application then wirelessly transmits the transcoded message to the network layer address of the second USB wireless dongle. The USB wireless dongles further comprise the second USB wireless dongle. The second USB wireless dongle comprises a second processor, a second radio transceiver, a second USB connector, a second memory storing a network layer address of the first USB wireless dongle, and a second application. The second application when executed by the second processor receives the message from the first USB wireless dongle. The second application then confirms that the first USB wireless dongle is its mate. The second application then communicates with the first USB wireless dongle.

In an embodiment, a mated plurality of universal serial bus (USB) wireless dongles is disclosed. The plurality of USB wireless dongles comprises a master USB wireless dongle. The master USB wireless dongle comprises a master processor, a master read only memory (ROM) storing network layer addresses of a plurality respondent USB wireless dongles, a master radio transceiver, a master USB connector, and a master application. The master application when executed by the master processor receives a USB formatted message input from the master USB connector. The master application then transcodes the USB formatted message for wireless transmission. The master application then wirelessly transmits the transcoded message to the network layer addresses of the plurality of respondent USB wireless dongles. The plurality of USB wireless dongles further comprises the plurality of respondent USB wireless dongles. The plurality of respondent USB wireless dongles each comprise, a processor, a ROM that stores the network address of the master USB wireless dongle, a radio transceiver, a USB connector, and an application. The application when executed by the processor receives messages from the master USB wireless dongle. The application then confirms that the master USB wireless dongle is the master USB wireless dongle. After confirming that the master USB wireless dongle is its master, the application then communicates with the master USB wireless dongle.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
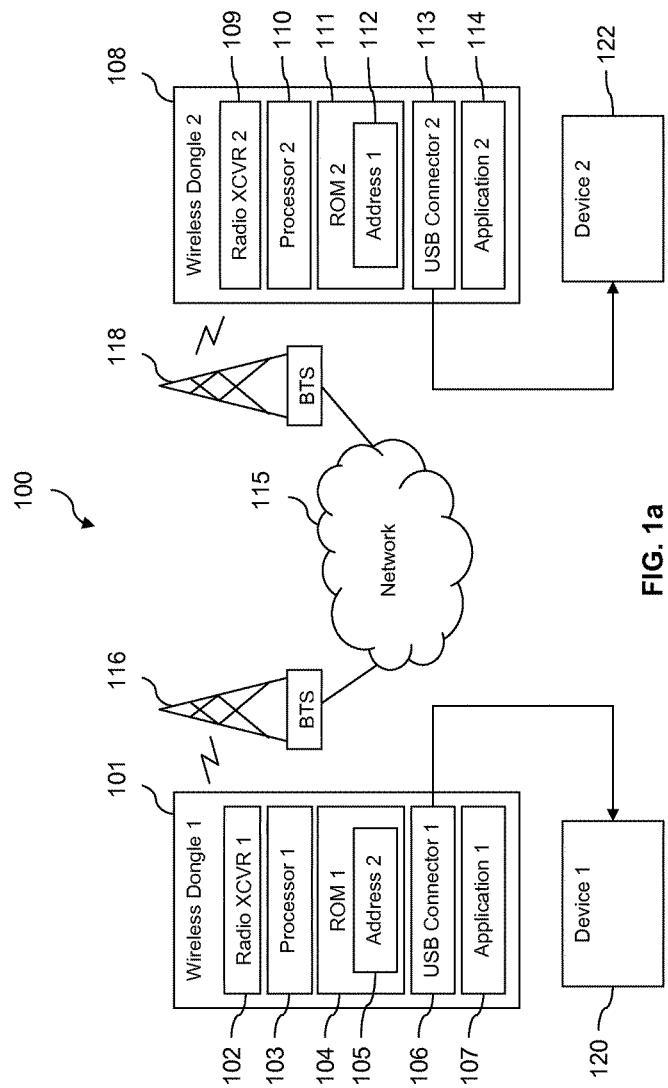
FIG. 1a is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a mated pair of universal serial bus (USB) wireless dongles. Each USB wireless dongle of such a mated pair of USB wireless dongles is configured to only communicate wirelessly with the network layer address of its mated counterpart USB wireless dongle. Thus, considering the communication over the mated pair of USB wireless dongles at the network layer, the mated pair of USB wireless dongles can be conceptualized to implement a USB cable of indefinite length. When two electronic devices are connected by a USB cable, security is present because it is known what devices are connected. A malicious device cannot intercept the communication between the two devices via the USB cable because it isn't itself connected to the USB cable. The mated pair of USB wireless dongles taught herein provides some of this kind of security. Other more sophisticated attempts to spoof devices could sniff the network layer traffic and spoof one of the counterpart USB wireless dongles, thereby undermining this kind of security. In some embodiments, additional provisions for countering this kind of more sophisticated attack are implemented. For example, encryption using encryption secrets only known to the mated USB wireless dongles may be employed to counter a sniffing/spoofing attack.

The mated pair of universal serial bus (USB) wireless dongles comprises a first USB wireless dongle and a second USB wireless dongle. The first USB wireless dongle and second USB wireless dongle each comprise a processor, a read only memory (ROM) that stores a network layer address of the counterpart USB wireless dongle, a radio transceiver, a USB connector, and an application. Each USB wireless dongle is pre-manufactured with the network layer address of its counterpart USB wireless dongle permanently configured in which effectively pairs the two USB wireless dongles. In some contexts, the network layer addresses of the counterpart USB wireless dongle may be said to be "burned-in" or "baked-in."

Each mated USB wireless dongle may also store and be manufactured with its own network layer address permanently configured into the memory, for example to support network layer communications such as propagating its network layer address to a router or to a wireless cellular network and such as receiving network layer messages directed to it by a router or by the wireless cellular network. In an embodiment, each of the mated USB wireless dongles may be provisioned by a wireless communication service provider to receive wireless communication service such as cellular communication service. The mated USB wireless dongles may not be initially provisioned for wireless communication service until they have been activated, for example at some point after the mated USB wireless dongles are purchased.

The application that executes on the processor of each mated USB wireless dongle enforces the restriction that the radio transceiver may only communicate at the network layer with its mate USB wireless dongle, e.g., with the network layer address of its counterpart USB wireless dongle that is burned into its RAM. This makes the USB wireless dongles a mated pair. Said in other words, the first mated USB wireless dongle can only communicate at the network layer to the network layer address of the second mated USB wireless dongle, and the second mated USB wireless dongle can only communicate at the network layer to the network layer address of the first mated USB wireless dongle. In an embodiment, the mated USB wireless dongles may be able to connect to various devices such as personal computers (PCs), tablets computers, and other devices via their USB connectors. The network layer addresses of the first and second mated USB wireless dongles may be internet protocol (IP) addresses.

It is understood that the network layer communication between the first and the second mated USB wireless dongles may transit multiple separate physical layer communication links and multiple separate data link layer communication links. It may be said herein that the application that executes on the processor of a mated USB wireless dongle restricts a destination address of a transmission by the radio transceiver of the mated USB wireless dongle to only the network layer address of its counterpart USB wireless dongle: this does not preclude this network layer communication from transiting multiple physical layer communication links and multiple data link layer communication links to effect the end-to-end network layer communication link between the mated USB wireless dongles.

In an embodiment, the first application receives a USB formatted message input from the first USB connector. The first application of the first USB wireless dongle transcodes the USB formatted message for wireless transmission to the second USB wireless dongle. The first application then wirelessly transmits the transcoded message to the network layer address of the second USB wireless dongle. The second application of the second USB wireless dongle receives the transcoded message from the first USB wireless dongle. The second application then confirms that the first USB wireless dongle is its mate. The confirmation that the second USB wireless dongle performs may comprise a handshake with the first USB wireless dongle. Both the first USB wireless dongle and the second USB wireless dongle may have security tokens that they may exchange between each other to confirm that they are their respective mate. Once the confirmation has been completed, the second USB wireless dongle and the first USB wireless dongle may communicate. The mated pair of USB wireless dongles may each comprise an encryption key and/or a security token. The USB wireless dongles may use the encryption key or security token to decrypt/unlock messages sent from the other USB wireless dongle. If the USB wireless dongle receives a message that it cannot decrypt/unlock using the encryption key/security token, the USB wireless dongle may recognize that the message that it received is not from its mate USB wireless dongle and ignore it. In an embodiment, the first USB wireless dongle may be connected to a digital camera and the second USB wireless dongle may be connected to a laptop computer. The digital camera may be located in Napa Valley, California and the laptop may be located in Dallas, Tex. Using the secure communication pathway between the first USB wireless dongle and the second USB wireless dongle, the camera may send pictures to the laptop while further being protected against sophisticated attacks by the use of encryption.

In an embodiment, the first and second USB wireless dongle may comprise a first trusted security zone and a second trusted security zone, respectively. The trusted security zones may provide hardware assisted trust to both the first USB wireless dongle and the second USB wireless dongle. The hardware assisted trust provided by the trusted security zones help to prevent attacks from outside sources while the USB wireless dongles are communicating.

In an embodiment, there may be a mated plurality of USB wireless dongles comprising one master USB wireless dongle and a plurality of respondent USB wireless dongles. The master USB wireless dongle and the respondent USB wireless dongles may function and communicate in a substantially similar manner to that in which the first USB wireless dongle and the second USB wireless dongle communicate with each other in the previous embodiment. The master USB wireless dongle may store permanently configured addresses of each of the respondent USB wireless dongles in ROM while the plurality of respondent USB wireless dongles may only store the permanently configured address of the master USB wireless dongle. If one of the respondent wireless dongles is lost, the master USB wireless dongle and the remainder of the plurality of respondent USB wireless dongles continue to function.

In an example of the master USB wireless dongle and the plurality of respondent USB wireless dongles working, a family of 5 may own a master USB wireless dongle and a plurality of respondent USB wireless dongles. In the example, the mother and father of three children located in Dallas, Tex. may own the master USB wireless dongle and their children may each own their own respondent USB wireless dongle. All three children may be at colleges across the United States and may want to send digital files to their parents using the security of a virtual long extended USB cable provided by the USB wireless dongles. The master USB wireless dongle and the three respondent USB wireless dongles may be connected to laptop or desktop computers. A son in Austin, Tex. may send pictures to his parent's computer via their master USB wireless dongle using his laptop via his respondent USB wireless dongle. Another son in Denver, Colo. may send a collection of poems written on his computer to his parent's computer via their master USB wireless dongle using his laptop via his respondent USB wireless dongle. And finally a daughter in Boston, Mass. may send a video recording to her parent's computer via their master USB wireless dongle using her laptop via her respondent USB wireless dongle. The parents may also send pictures of the family dog to their children using their computer via their master USB wireless dongle to each of the children's computers via each of the respondent USB wireless dongles.

With the mated pair of USB wireless dongles, users may be able to wirelessly communicate between the USB ports of two electronic devices using a secure pathway. Because the USB wireless dongles are mated, the USB wireless dongles are only able to communicate at the network layer with each other and no other devices at the network layer. This allows the data on the USB wireless dongles to be transmitted and protected from attack while communicating. To counter more sophisticated attacks that may involve sniffing internet traffic and spoofing communications of one or the other of the USB wireless dongles (e.g., determining the network layer address of the first USB wireless dongle by sniffing the source IP address and the destination IP address in an IP header of an IP datagram transmitted by the first USB wireless dongle, creating a new IP datagram that copies the source IP address and the destination of the sniffed IP datagram, injecting some bogus information in the IP data portion, and transmitting the spoofed IP datagram), the mated pair of USB wireless dongles may employ encryption and burned in encryption keys. Thus, the first USB wireless dongle may encrypt its data using a burned in encryption key, send the encrypted data in an IP datagram to the second USB wireless dongle; the second USB wireless dongle may decrypt the data in a received IP datagram using a burned in encryption key. If the IP datagram is spoofed, the data will not be properly encrypted, hence will not decrypted appropriately, and will not be processed as authorized communication by the second USB wireless dongle.

Turning now to FIG. 1a, a system 100 is described. The system 100 comprises a first universal serial bus (USB) wireless dongle 101. The first USB wireless dongle 101 comprises a first radio transceiver 102, a first processor 103, a first read only memory (ROM) 104 that stores a network layer address 105 of a second USB wireless dongle 108, a first USB connector 106, and a first application 107. The system 100 comprises the second USB wireless dongle 108. The second USB wireless dongle 108 comprises a second radio transceiver 109, a second processor 110, a second ROM 111 that stores a network layer address 112 of the first USB wireless dongle 101, a second USB connector 113, and a second application 114. The system 100 comprises a network 115, a first base transceiver station 116, and a second base transceiver station 118. The system 100 comprises a first device 120 that may be connected to first USB wireless dongle 101 by the first USB connector 106, and a second device 122 that may be connected to the second USB wireless dongle 108 by the second USB connector 113.

The first USB wireless dongle 101 and the second USB wireless dongle 108 are a mated pair. The first and second USB wireless dongles 101/108 may be content protection devices that, when connected or attached to a computer or other electronic device, unlocks software functionality or decodes content. The network layer address 105/112 of the opposite USB wireless dongle 101/108 may be pre-manufactured permanently configured, burned-in, or baked-in to the ROMs 104/111 of each USB wireless dongle 101/108, where each USB wireless dongle 101/108 may only communicate with its counterpart. The term "permanently configured" may also be referred to as burned-in or baked-in. It is understood, however, that in an embodiment the process of permanently configuring the network layer address of the mate dongle 101/108 into a dongle need not involve the use of heat and/or of destroying fuse elements through high current flows. Thus, in some contexts the use of the term "burned-in" or "baked-in" may be figurative rather than literal. This configuration effectively makes them a mated pair. This may be the case so that the first and second USB wireless dongles 101/108 may communicate only with each other and thus, communicate safely without threat of attack from outside sources. For example, if the first USB wireless dongle 101 receives a message from another wireless dongle that is not the second USB wireless dongle 108, it may ignore the message because it does not recognize the message as a message from the second USB wireless dongle 108. This is discussed further below.

The USB wireless dongles 101/108 may be configured to communicate with the network 115 via the base transceiver stations 116/118 using the radio transceivers 102/109. The USB wireless dongles 101/108 may communicate according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, a Wi-Fi wireless protocol, a Bluetooth wireless protocol, or another well-known wireless protocol. The addresses 105/112 are network layer addresses or layer three addresses, e.g., internet protocol (IP) or other kinds of addresses. The USB wireless dongles 101/108 may connect via the USB connectors 106/113 to a plurality of devices such as the devices 120/122 that may comprise one or more of a desktop computer, a laptop computer, a tablet computer, and other devices. While two USB wireless dongles 101/108 and two base transceiver stations 116/118 are illustrated in FIG. 1*a*, it is understood that the system 100 may comprise any number of mated USB wireless dongles and base transceiver stations. The network 115 may be a private network, a public network, or a combination thereof.

In an embodiment, the first application 107 is executed by the first processor 103 of the first USB wireless dongle 101. The first application 107 receives a USB formatted message input via the first USB connector 106 from the first device 120. The first application 107 then transcodes the USB formatted message for wireless transmission. In an embodiment, the first application 107 is designed to use only the permanently configured network layer address as the network layer destination address for all communication transmissions. The first application 107 then wirelessly transmits the transcoded message to the network layer address 105 of the second USB wireless dongle 108; this is the permanently configured address. The second application 114 of the second USB wireless dongle 108 receives the message from the first USB wireless dongle 101. The second application 114 then confirms that the first USB wireless dongle 101 is its mate. In an embodiment, the second application 114 is designed to use only the permanently configured network layer address at the network layer destination for all communication transmissions.

In an embodiment, the first and second USB wireless dongles 101/108 may comprise encryption keys or security tokens, for example, encryption keys or security tokens may be stored to the ROMs 104/111 (e.g., encryption keys or security tokens may be burned into each of the USB wireless dongles 101, 108). The encryption key/security token may be used by the respective USB wireless dongle 101/108 to decrypt or unlock messages that they receive from the other USB wireless dongle 101/108. The USB wireless dongles 101/108 may also evaluate any message that they receive and check to see that the message comes from the network layer address 105/112 of the counterpart USB wireless dongle 101/108, e.g., network layer message header source address. If a sender's address doesn't match the network layer addresses 105/112, the first and second USB wireless dongles 101/108 may ignore the message. This check to make sure that the other USB wireless dongle 101/108 is its mate provides security for each USB wireless dongle 101/108. After confirming that the first USB wireless dongle 101 is its mate, the second USB wireless dongle 108 communicates with the first USB wireless dongle 101.

In an embodiment, the first and second USB wireless dongles 101/108 may have the addresses 105/112 of each other configured in their ROMs 104/111, but may also have the ability to configure a different address into the ROMs 104/111. Alternatively, the first and second USB wireless dongles 102/108 may have no network layer addresses 105/112 configured initially (e.g., at time of manufacture and/or at time of purchase by the end user), and network layer addresses may be configured by an end user after manufacturing and after purchase. The network layer addresses 105/112 may not be permanently configured in to the ROMs 104/111 until they have been used. This may be so in case one of the USB wireless dongles 101/108 is lost before use, the one that is not lost may be used by becoming a mate with another USB wireless dongle.

In an embodiment, a digital camera may be used as an example for the first device 120 and a laptop computer may be used as an example for the second device 122. The digital camera 120 along with the first USB wireless dongle 101 may be located at a hotel in Napa Valley, Calif. while the laptop computer 122 and the second USB wireless dongle 108 may be located in Dallas, Tex. A subject who owns the digital camera 120 may want to send pictures to a subject that owns the laptop computer 122. The first subject connects the first USB wireless dongle 101 to a USB port of the digital camera 120 using the first USB connector 106, and the second subject connects the second USB wireless dongle 108 to a USB port of the laptop computer 122 using the second USB connector 113. The first application 107 receives a USB formatted message via the first USB connector 106 from the digital camera 120. The first application 107 then transcodes the USB formatted message for wireless transmission to the network layer address 105 of the laptop computer 122 (recall that the burned in network layer address referred to is not the address of the USB wireless dongle itself but instead the network layer address of its counterpart USB wireless dongle).

The first application 107 then wirelessly transmits the transcoded message to the network layer address 105 of the second USB wireless dongle 108 via the base transceiver stations 116/118 and the network 115. The second USB wireless dongle 108 receives the transcoded message from the first USB wireless dongle 101 (via the intermediary of wireless links provided by the BTSs 116, 118 and via wired links provided by the network 115, which may be conceived of as physical layer and data link layer communication links). The second application 114 of the second USB wireless dongle 108 then confirms that the message was sent from the first USB wireless dongle 101 by checking the network layer source address in a header of the message (e.g., a source IP address in the IP header of an IP datagram message). Once the second application 114 confirms that the message is from the first USB wireless dongle 101, it then transmits the data according to the USB protocol to the second USB connector 113 to the second device 122 (e.g., the laptop computer in Dallas). Thereby pictures are transmitted from the camera to the laptop over a considerable distance but with security of a virtual long extended USB cable. It is noted that the communication described above could be further protected against more sophisticated attacks by the use of encryption.

In another example, a laptop computer may be used as an example for the first device 120 and a printer may be used as an example for the second device 122. The laptop 120 along with the first USB wireless dongle 101 may be located at a hotel in Denver, Colo. while the printer 122 and the second USB wireless dongle 108 may be located in Portland, Oreg. A subject who owns the laptop computer 120 may want to send a collection of poetry to the printer 122. The first subject connects the first USB wireless dongle 101 to a USB port of the laptop 120 using the first USB connector 106, and the second subject connects the second USB wireless dongle 108 to a USB port of the printer 122 using the second USB connector 113. The first application 107 receives a USB formatted message via the first USB connector 106 from the laptop computer 120. The first application 107 then transcodes the USB formatted message for wireless transmission to the network layer address 105 of the printer 122 (recall that the burned in network layer address referred to is not the address of the USB wireless dongle itself but instead the network layer address of its counterpart USB wireless dongle). The first application 107 then wirelessly transmits the transcoded message to the network layer address 105 of the second USB wireless dongle 108 via the base transceiver stations 116/118 and the network 115.

Figure 1B:
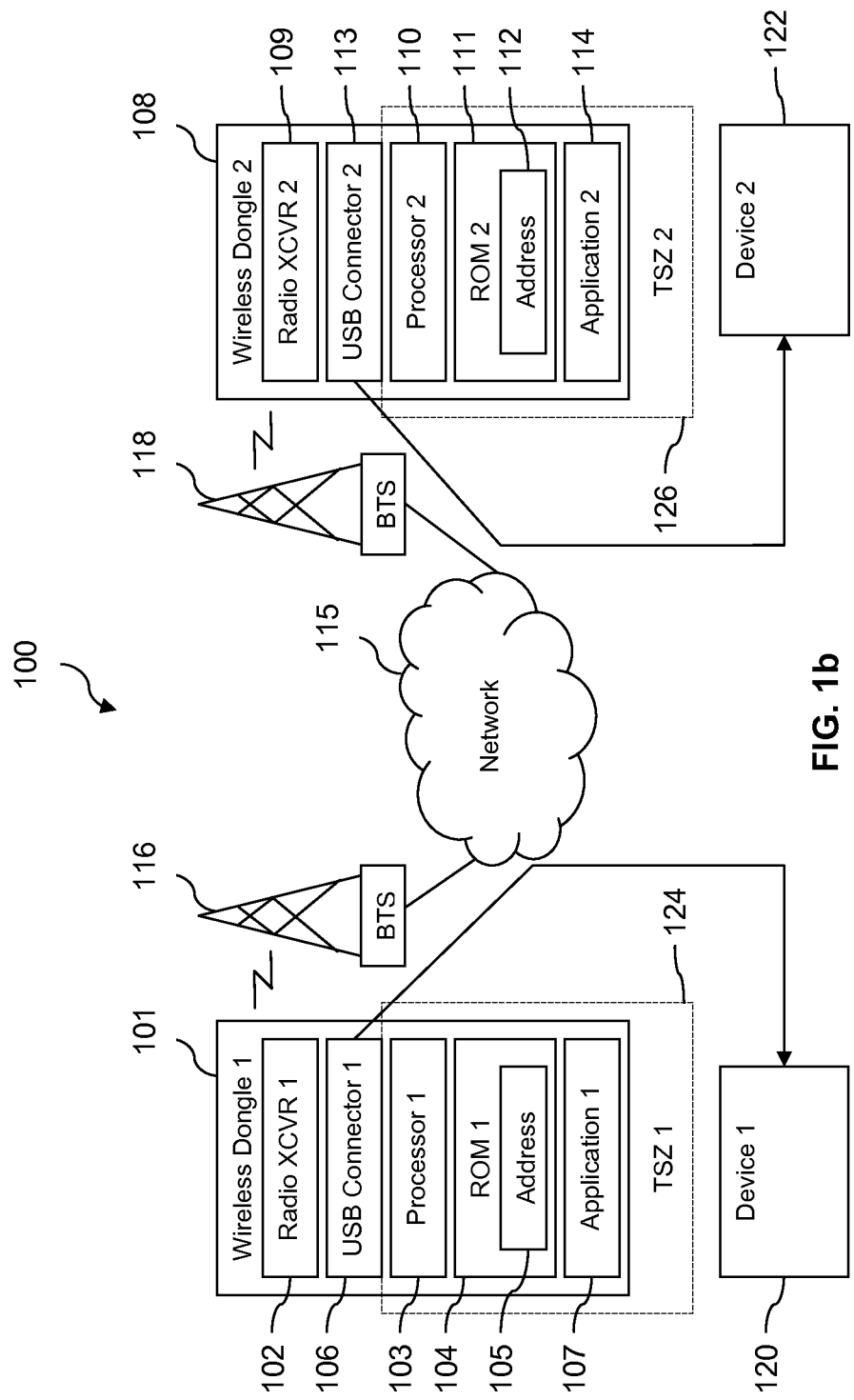
FIG. 1b is a block diagram of a system according to an embodiment of the disclosure.

The second USB wireless dongle 108 receives the transcoded message from the first USB wireless dongle 101 (via the intermediary of wireless links provided by the BTSs 116, 118 and via wired links provided by the network 115, which may be conceived of as physical layer and data link layer communication links). The second application 114 of the second USB wireless dongle 108 then confirms that the message was sent from the first USB wireless dongle 101 by checking the network layer source address in a header of the message (e.g., a source IP address in the IP header of an IP datagram message). Once the second application 114 confirms that the message is from the first USB wireless dongle 101, it then transmits the data according to the USB protocol to the second USB connector 113 to the second device 122 (e.g., the printer in Portland). Thereby pictures are transmitted from the camera to the printer over a considerable distance but with security of a virtual long extended USB cable. It is noted that the communication described above could be further protected against more sophisticated attacks by the use of encryption In FIG. 1b, a substantially similar system to the system 100 is described. The substantially similar system comprises the first USB wireless dongle 101, the second USB wireless dongle 108, the network 115, the first and second base transceiver stations 116/118, and the devices 120/122. In the substantially similar system, the first USB wireless dongle 101 comprises a first trusted security zone 124, and the second USB wireless dongle 108 comprises a second trusted security zone 126. In an embodiment first and second trusted security zones 124/126 may provide hardware assisted trust to the first and second USB wireless dongles 101/108. The first trusted security zone 124 may provide hardware assisted trust to the first processor 103, the first ROM 104, and the first application 107 of the first USB wireless dongle 101. The second trusted security zone 126 may provide hardware assisted trust to the second processor 110, the second ROM 111, and the second application 114 of the second USB wireless dongle 108. The substantially similar system to the system 100 may execute in a substantially similar manner, but may use the first and second trusted security zones 124/126 for further hardware assisted trust and security.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of nontrusted applications to peripherals, such as data inputs and data outputs, while a trusted application is running in the secure execution environment. In an embodiment, the trusted security zone may be conceptualized as hardware assisted security.

A complete Trusted Execution Environment (TEE) may be implemented through the use of the trusted security zone hardware and software architecture. The Trusted Execution Environment is an execution environment that is parallel to the execution environment of the main mobile device operating system. The Trusted Execution Environment and/or the trusted security zone may provide a base layer of functionality and/or utilities for use of applications that may execute in the trusted security zone. For example, in an embodiment, trust tokens may be generated by the base layer of functionality and/or utilities of the Trusted Execution Environment and/or trusted security zone for use in trusted end-to-end communication links to document a continuity of trust of the communications. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution Environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 2:
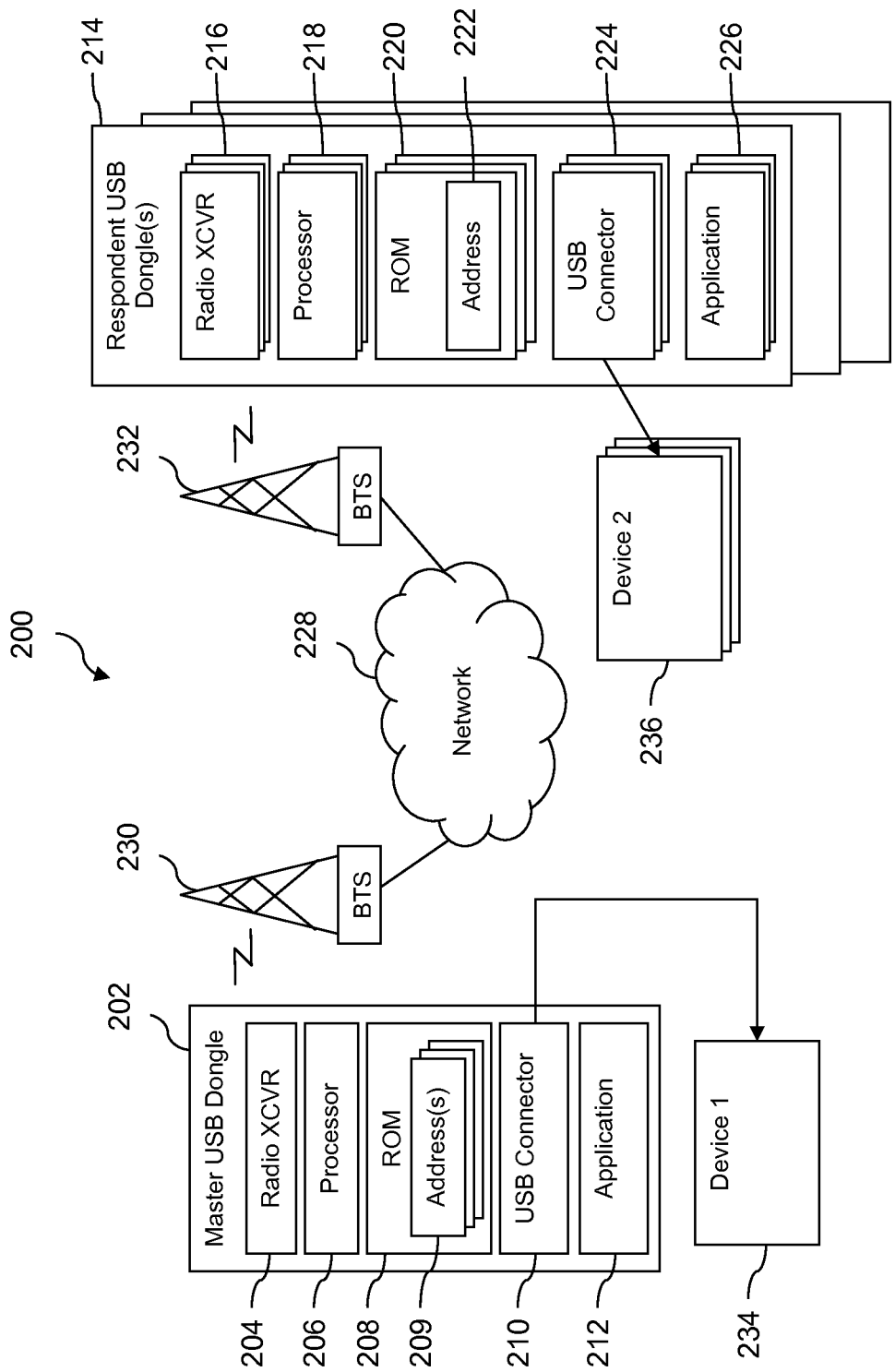
FIG. 2 is a block diagram of a system according to an embodiment of the disclosure.

In FIG. 2, a system 200 is described. The system 200 may comprise a master universal serial bus (USB) wireless dongle 102. The master USB wireless dongle 202 may comprise a master radio transceiver 204, a master processor 206, a master read only memory (ROM) 208 that stores a plurality of network layer addresses 209 of a plurality of respondent USB wireless dongles 214, a master USB connector 210, and a master application 212. The system 200 further comprises the plurality of respondent USB wireless dongles 214. The plurality of USB wireless dongles 214 further comprises a plurality of respective radio transceivers 216, a plurality of respective processors 218, a plurality of respective ROMs 220 that store a wireless address 222 of the master USB wireless dongle 202, a plurality of respective USB connectors 224, and a plurality of respective applications 226. In an embodiment the master USB wireless dongle 202 and the plurality of respondent USB wireless dongles 214 are a mated plurality of USB wireless dongles. The master USB wireless dongle 202 may have the network layer addresses 209 of the plurality of respondent USB wireless dongles 214 pre-manufactured or "baked-in" to the master ROM 208. The plurality of respondent USB wireless dongles 214 may also have the network layer address 222 of the master USB wireless dongle 202 pre-manufactured or "baked-in" to their respective ROMs 220. This may effectively make the master USB wireless dongle 202 and the plurality of respondent USB wireless dongles 214 a mated plurality of USB wireless dongles.

The system 200 further comprises a network 228, two base transceiver stations (BTSs) 230/232, a master device 234 that is connected to the master USB wireless dongle 202 by the master USB connector 210, and a plurality of second devices 236 that the plurality of respondent USB wireless dongles 214 are connected to by their respective USB connectors 224. The master device 234 and the plurality of second devices 236 may be one or more of desktop computers, laptop computers, tablet computers, or other devices. While two base transceiver stations 230/232 are illustrated in FIG. 2, it is understood that the system 200 may comprise any number of base transceiver stations. The network 228 may be a private network, a public network, or a combination thereof.

The plurality of respondent USB wireless dongles 214 may comprise at least two respondent USB wireless dongles 214. The plurality of respondent USB wireless dongles 214 may further comprise at least three, five, eight, ten or more respondent USB wireless dongles 214.

In an embodiment, the master application 212 is executed by the master processor 206 of the master USB wireless dongle 202. The master application 212 receives a USB formatted message input from the master device 234 via the master USB connector 210 that is connected to the master device 234. The master application 212 then transcodes the USB formatted message for wireless transmission. The master application 212 then wirelessly transmits the transcoded message to the network layer address 209 of one or more of the plurality of respondent USB wireless dongles 214. The plurality of respective applications 226 of the plurality of respondent USB wireless dongles 214 receives the messages from the master USB wireless dongle 202. The plurality of respective applications 226 then confirms that the master USB wireless dongle 202 is their master. The respective applications 226 of the plurality of respondent USB wireless dongles 214 may evaluate the message that it receives from the master USB wireless dongle and check to see if the network layer address 222 that the message was sent from is the pre-manufactured or baked-in network layer address 222 of the master USB wireless dongle 202, e.g. examining the source address in the network layer message header (for example, the source IP address in an IP header of an IP datagram). If it does not match the pre-manufactured network layer address 222, plurality of respondent USB wireless dongles 214 may ignore the message. The master USB wireless dongle 202 may go through a substantially similar process when it receives messages from the plurality of respondent USB wireless dongles 214. This check helps to keep the master USB wireless dongle 202 and the plurality of respondent USB wireless dongles 214 safe from attack from outside sources while they communicate.

In an embodiment, the master USB wireless dongle 202 and the plurality of respondent USB wireless dongles 214 may each comprise an encryption key or a security token that may be used to decrypt or unlock received messages. These encryption keys or security tokens may be burned in the devices 202, 214 when manufactured. The master USB wireless dongle 202 may use its own encryption key/security token to decrypt/unlock messages received from one or more of the plurality of respondent USB wireless dongles 214. The plurality of respondent USB wireless dongles 214 may use the encryption key/security token to decrypt/unlock messages from the master USB wireless dongle 202. These encryption keys and/or security tokens may only work with USB wireless dongles that are mated with each other and not with unmated USB wireless dongles.

After confirming that the master USB wireless dongle 202 is its master, the plurality of respondent USB wireless dongles 214 may communicate with the master USB wireless dongle 202. In an embodiment, if one of the plurality of respondent USB wireless dongles 214 is lost, the rest of the respondent USB wireless dongles 214 may continue to work as a loss of one of the respondent USB dongles 214 does not affect communication of the other respondent USB wireless dongles 214 with the master USB wireless dongle 202. In an embodiment, the respondent USB wireless dongles 214 may initiate communication with the master USB wireless dongle 202 as the master USB wireless dongle initiates communication with the plurality of respondent USB wireless dongles 214.

In an example, the master USB wireless dongle 202 may be connected to a master device 234 via the master USB connector 210. Some of the plurality of respondent USB wireless dongles 214 may be connected to three respondent devices 236 via the plurality of respondent USB connectors 224. In the example, the master device 234 may be a desktop computer and the plurality of devices 236 may be laptop computers. Parents of three children may own the desktop computer 234 and be located in Dallas, Tex. The three children of the parents, two sons and a daughter may own the laptop computers 236 and be located in Austin, Tex., Denver, Colo., and Boston, Mass., respectively. Their first son, in Austin, may send pictures to his parent's desktop computer 234 using his laptop computer 236 via his respondent USB wireless dongle 214. Their other son, in Denver, may send a collection of poems written on his laptop computer 236 via his respondent USB wireless dongle 214. Their daughter, in Boston, may send a video that she recorded to the desktop computer 234 using her laptop computer 236 via her respondent USB wireless dongle 214. The parents may also send pictures of the family dog to their children using their desktop computer 234 to the children's laptop computers 236 using their master USB wireless dongle 202.

In an embodiment, the master USB wireless dongle 202 and the respondent USB wireless dongles 214 may have the network layer addresses 209/222 of each other, but may also have the ability to configure a different address into the ROMs 208/220. The network layer addresses 209/222 may not be permanently configured until they have been used. This may be so in case one of the USB wireless dongles 202/214 is lost before use, the one that is not lost may be used by becoming a mate with another USB wireless dongle.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mated pair of universal serial bus (USB) wireless dongles, comprising:
   a first USB wireless dongle, comprising:
      a first processor,
      a first read only memory (ROM) storing a network layer address of a second USB wireless dongle,
      a first radio transceiver,
      a first USB connector,
      a first application that, when executed by the first processor,
         receives a USB formatted message input from the first USB connector,
         transcodes the USB formatted message for wireless transmission, and
         wirelessly transmits the transcoded message to the network layer address of the second USB wireless dongle via a base transceiver station,
         wherein the first application restricts a destination address of the transmission by the first radio transceiver to only the network layer address of the second USB wireless dongle,
      and
   the second USB wireless dongle, comprising:
      a second processor,
      a second ROM storing a network layer address of the first USB wireless dongle,
      a second radio transceiver,
      a second USB connector,
      a second application that, when executed by the second processor,
         receives the transcoded message from the first USB wireless dongle,
         confirms that the first USB wireless dongle is its mate, and
         communicates with the first USB wireless dongle,
         wherein the second application restricts a destination address of a transmission by the second radio transceiver to only the network layer address of the first USB wireless dongle.

2. The method of claim 1, wherein the first and second USB wireless dongles are configured to communicate using their radio transceivers according to wireless protocols.

3. The method of claim 2, wherein the first and second USB wireless dongles communicate according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or a Wi-Fi wireless protocol.

4. The method of claim 1, wherein the first and second USB wireless dongles connect to one or more of a desktop computer, a laptop computer, and a tablet computer.

5. The method of claim 1, wherein the second application confirms that the first USB wireless dongle is its mate by comparing a network layer header source address of the transcoded message to the network layer address of the first USB wireless dongle stored in the second ROM.

6. The method of claim 1, wherein each ROM stores an encryption key that encrypts outgoing messages and decrypts incoming messages.

7. The method of claim 1, wherein each ROM stores a security token that locks outgoing messages and unlocks incoming messages.

8. A mated pair of universal serial bus (USB) wireless dongles, comprising:
a first USB wireless dongle, comprising:
a first processor,
a first radio transceiver,
a first USB connector,
a first memory storing a network layer address of a second USB wireless dongle,
a first application that, when executed by the first processor,
receives a USB formatted message input from the first USB connector,
transcodes the USB formatted message for wireless transmission,
wirelessly transmits the transcoded message to the address of the second USB wireless dongle via a base transceiver station, and
a second USB wireless dongle, comprising:
a second processor,
a second radio transceiver,
a second USB connector,
a second memory storing a network layer address of the first USB wireless dongle,
a second application that, when executed by the second processor,
receives the transcoded message from the first USB wireless dongle,
confirms that the first USB wireless dongle is its mate, and
communicates with the first USB wireless dongle.

9. The method of claim 8, wherein the first application of the first USB wireless dongle restricts a destination address of a wireless transmission of a message to only the network layer address of the second USB wireless dongle, and the second application of the second USB wireless dongle restricts a destination address of a wireless transmission of a message to only the network layer address of the first USB wireless dongle.

10. The method of claim 8, wherein each application checks a network layer header source address of each message that they receive.

11. The method of claim 8, wherein the first and second memories have a trusted security zone that provides hardware assisted trust to the first USB wireless dongle and the second USB wireless dongle.

12. The method of claim 8, wherein the first and second USB wireless dongles connect to one or more of a desktop computer, a laptop computer, and a tablet computer.

13. The method of claim 8, wherein the network layer address of the second USB wireless dongle is permanently configured in the first memory of the first USB wireless dongle and the network layer address of the first USB wireless dongle is permanently configured in the second memory of the second USB wireless dongle at the time of manufacture of the first and second USB wireless dongles.

14. The method of claim 8, wherein the first and second USB wireless dongles communicate according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or a Wi-Fi wireless protocol.

15. A mated plurality of universal serial bus (USB) wireless dongles, comprising:
a master USB wireless dongle, comprising:
a master processor,
a master read only memory (ROM) storing a network layer address of each of a plurality respondent USB wireless dongles,
a master radio transceiver,
a master USB connector,
a master application that, when executed by the master processor,
receives a USB formatted message input from the master USB connector,
transcodes the USB formatted message for wireless transmission,
wirelessly transmits the transcoded message to the addresses of the plurality of respondent USB wireless dongles dongle via a base transceiver station, and
the plurality of respondent USB wireless dongles, each comprising:
a processor,
a ROM storing a network layer address of the master USB wireless dongle, a radio transceiver,
a USB connector,
an application that, when executed by the processor,
receives transcoded messages from the master USB wireless dongle,
confirms that the master USB wireless dongle is the master USB wireless dongle, and
communicates with the master USB wireless.

16. The method of claim 15, wherein the network layer address of the master USB wireless dongle is pre-manufactured into the respective ROMs of the plurality of respondent USB wireless dongles and the network layer addresses of the plurality of respondent USB wireless dongles is pre-manufactured into the ROM of the master USB wireless dongle.

17. The method of claim 15, wherein the master application of the master USB wireless dongle restricts a destination address of wireless transmission of a message to only the network layer addresses of the plurality of respondent USB wireless dongles, and the application of each of the plurality of respondent USB wireless dongle restricts a destination address of wireless transmission of a message to only the network layer address of the master USB wireless dongle.

18. The method of claim 15, wherein each application checks a network layer header source address of each message that they receive.

19. The method of claim 15, wherein the plurality of respondent USB wireless dongles comprises at least two wireless dongles.

20. The method of claim 15, wherein the plurality of respondent USB wireless dongles comprises at least three, five, eight, or ten USB wireless dongles.

* * * * *